(12) United States Patent
Fukui et al.

(10) Patent No.: US 6,347,646 B2
(45) Date of Patent: Feb. 19, 2002

(54) FLEXIBLE HOSE

(75) Inventors: Kouki Fukui; Hiroyuki Amatsutsu, both of Takatsuki (JP)

(73) Assignee: Totaku Industries, Inc., Osaka (JP)

( * ) Notice: Subject to any disclaimer, the term of this patent is extended or adjusted under 35 U.S.C. 154(b) by 0 days.

(21) Appl. No.: 09/800,666

(22) Filed: Mar. 8, 2001

(30) Foreign Application Priority Data

Mar. 8, 2000 (JP) ......................................... 2000-063033

(51) Int. Cl.$^7$ ................................................. F16L 11/00
(52) U.S. Cl. ...................... 138/129; 138/121; 138/122; 138/133; 138/131
(58) Field of Search ............................... 138/129, 122, 138/121, 131, 133

(56) References Cited

U.S. PATENT DOCUMENTS

| | | | | |
|---|---|---|---|---|
| 3,297,055 A | * | 1/1967 | Beck | 138/129 X |
| 3,706,326 A | * | 12/1972 | Bringolf | 138/129 |
| 3,739,815 A | * | 6/1973 | Rejeski | 138/129 X |
| 3,889,716 A | * | 6/1975 | Linhart | 138/129 |
| 4,304,266 A | * | 12/1981 | Kutnyak et al. | 138/129 |
| 4,489,759 A | * | 12/1984 | Yamamura | 138/129 X |
| 4,862,924 A | * | 9/1989 | Kanao | 138/122 X |
| 5,954,096 A | * | 9/1999 | Lepoutre | 138/129 |
| 6,186,183 B1 | * | 2/2001 | Lepoutre | 138/129 X |

FOREIGN PATENT DOCUMENTS

| | | |
|---|---|---|
| JP | 07-100926 | 1/1995 |
| JP | 09-135795 | 5/1997 |
| JP | 2000-262435 | 9/2000 |
| JP | 2000-262445 | 9/2000 |

* cited by examiner

*Primary Examiner*—Patrick Brinson
(74) *Attorney, Agent, or Firm*—Wenderoth, Lind, & Ponack, L.L.P.

(57) ABSTRACT

A flexible hose having a sufficient strength while ensuring the air permeability is provided. In a hose formed by winding a soft resin tape helically such that leading tape end brim portions and trailing end brim portions extending in the hose longitudinal direction are overlapped to each other in the hose radial direction, gaps for ventilation for making the inside of the hose and the outside communicate with each other is formed by interposing a gap forming member having a concavo-convex shape between both end brim portions or forming a concavo-convex shape on one of surfaces of the end brim portions which face each other in an opposed manner.

12 Claims, 7 Drawing Sheets

(A)

(B)

FLEXIBLE HOSE

BACKGROUND OF THE INVENTION

1. Field of the Invention

The present invention relates to a flexible hose provided with a partial air-permeability which has proper flexibility and strength despite of an air-permeable structure.

2. Related Art

In the flexible hose to be used as a sucking/discharging or blowing duct, a portion of the air to pass through the hose may have to be discharged to the outside from midway of the hose or sucked from the outside. For example, an electric conductor is inserted into the hose, but its heat generation can be suppressed by introducing cooling air into the hose. At this time, the cooling efficiency can be better improved by introducing fresh air through the individual portions in the hose longitudinal direction from the outside.

Alternatively, the entrance of a hose is disposed to face the hot wind exit of a warming fan heater to introduce the hot wind into the hose and to blow out the hot wind from the midway air-permeable portion. Then, it is conceivable to utilize the hose for drying the wash or to utilize the hose as a steamer by disposing wet cloth in the air-permeable portion.

As a structure of such a flexible hose, it may be considered that the whole flexible hose is made of an air-permeable material. In this case, however, since a large number of vent apertures are formed in the hose, there arise drawbacks that the strength of the flexible hose as a whole is deteriorated and it is difficult to maintain the shape of the flexible hose.

OBJECT AND SUMMARY OF THE INVENTION

Accordingly, it is an object of the present invention to provide a flexible hose which is obtained by winding a soft resin tape helically, wherein a gap forming member which allows the inside and the outside of the hose to communicate with each other is interposed between overlapped portions of end brim portions in the hose longitudinal direction of the soft resin tape, or a gap forming concavo-convex shape is formed on a resin tape per se and the resin tape is wound, whereby the flexible hose having a sufficient strength while ensuring the air permeability can be provided.

It is another object of the present invention to provide a flexible hose which can be manufactured at a low cost since the flexible hose necessitates no special members for forming gaps and can be manufactured by merely winding a resin tape helically while overlapping end brim portions thereof.

It is a further object of the present invention to provide a flexible hose in which a resin tape made of soft resin is reinforced by a reinforcing core so that the hose has a proper flexibility and a proper strength whereby the hose is the most suitable as a hose having its use in fields where the hose is repeatedly bent.

Other objects of the present invention and advantages obtained by the present invention are apparent in view of following embodiments which are explained hereinafter in conjunction with attached drawings.

DETAILED DESCRIPTION OF THE PREFERRED EMBODIMENTS

Figure 1:
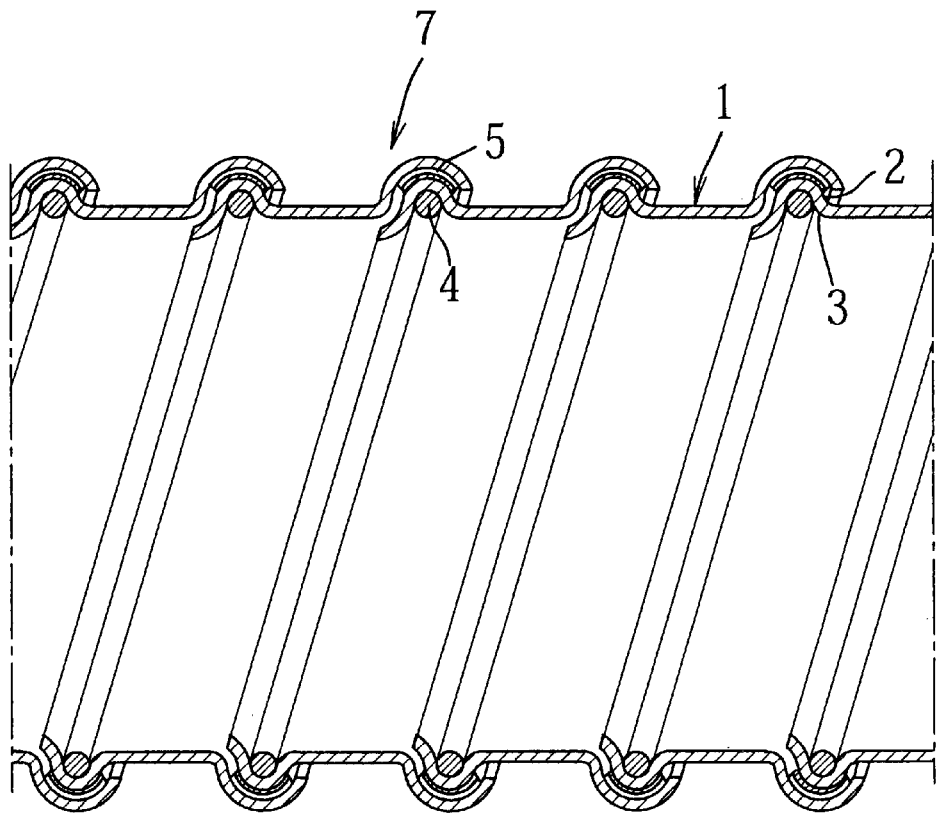
FIG. 1 is a cross-sectional view of a flexible hose of one embodiment of the present invention.
Figure 2:
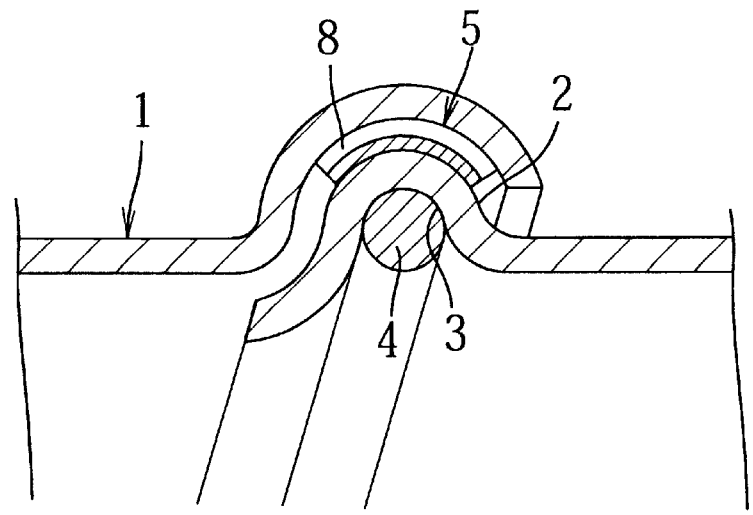
FIG. 2 is an enlarged view of an essential part of FIG. 1.
Figure 3:
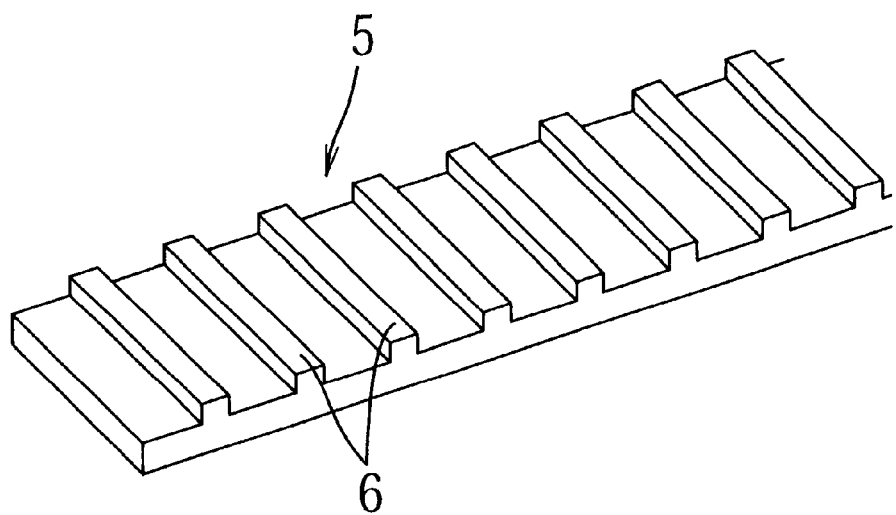
FIG. 3 is a perspective view of an essential part of each gap forming member used in the flexible hose of FIG. 1.
Figure 3:
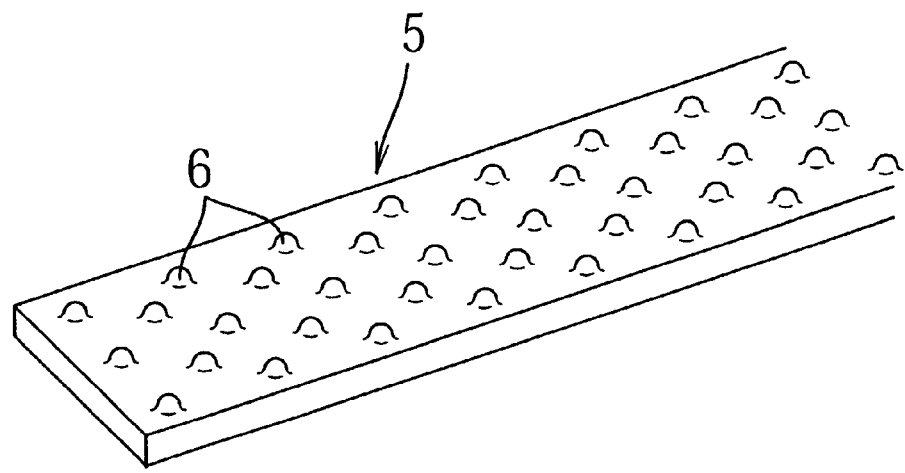

In FIGS. 1, 2 and 3, reference numeral 1 designates a soft resin tape of the invention, as made of a non-vinyl chloride resin such as a polyolefin resin or polystyrene resin, or a vinyl chloride resin.

This resin tape 1 is semicircularly bulged at its two widthwise spaced portions to form two ridges 2 and 2 in the tape longitudinal direction on the outer side portion for the hose outer circumference and two grooves 3 and 3 also in the tape longitudinal direction in the inner side portion for the inner circumference.

In these grooves 3 and 3, individually, there are buried and fixed linear reinforcing cores 4 and 4 to give the tape 1 proper flexibility and strength. These reinforcing cores 4 and 4 are made of a hard resin such as polypropylene or a metal wire.

Reference 5 indicates a gap forming tape which constitutes a gap forming member of the present invention. The gap forming tape 5 has a width smaller than a width of the ridge 2 portions of the resin tape 1. Then, as shown in FIG. 3(A), as the gap forming tape 5, a gap forming tape which forms a concavo-convex shape on a surface thereof by forming a large number of protrusions 6 penetrating in the widthwise direction at a given interval in the longitudinal direction may be used. Although a resin material or the like having a relatively high hardness is used as a material of this gap forming tape 5, the material is not limited to such a resin material or the like.

Figure 4:
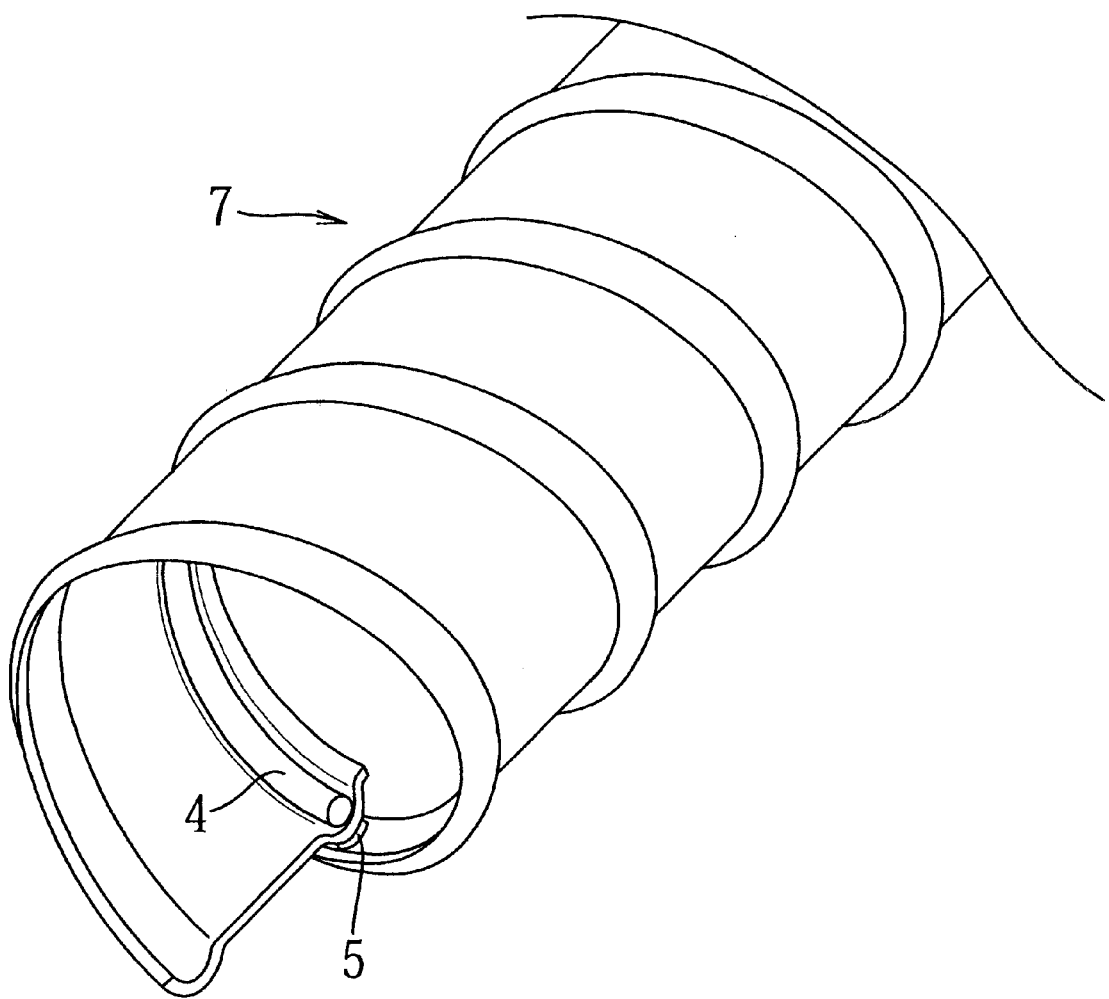
FIG. 4 is a perspective view showing the manner of winding a resin tape for forming the flexible hose of FIG. 1.

Then, as shown in FIG. 4, a hose 7 is formed by winding the resin tape 1 helically. Here, according to this embodiment, the resin tape 1 is wound in such a manner that leading end brim portions of the resin tape 1 extending in the hose longitudinal direction overlaps the outsides of the ridges 2 of corresponding trailing end brim portions of the resin tape 1 and the above-mentioned gap forming tape 5 is interposed between these end brim portions.

This gap forming tape 5 is wound integrally with the resin tape 1 by having both surfaces thereof adhered to or welded to the end brim portions to which both surfaces face in an opposed manner. In this case, since the concavo-convex shape is formed on a front surface or on a rear surface of the gap forming tape 5 (on the front surface side shown in FIG. 1 and FIG. 2) by the above-mentioned protrusions 6, a large number of vent gaps 8 which make the inside and outside of hose 7 communicate with each other are formed at the bottom portions of the concavo-convex shape. Due to such a constitution, a gas inside the hose 7 can be discharged to the outside through these vent gaps 8 or a gas outside the hose 7 can be taken into the inside of the hose 7 through these vent gaps 8.

In winding the gap forming tape 5 helically with the resin tape 1, following two methods are available. In one method, the gap forming tape 5 is wound helically while adhering or fusing the gap forming tape 5 to the end brim portions of the resin tape 1 at the time of winding the resin tape 1 helically. In the other method, the gap forming tape 5 is preliminarily adhered to or fused to one end brim portions of the resin tape 1.

The concavo-convex shape for forming the vent gaps is not limited to the above-mentioned protrusions 6 and take any shape so long as the bottom portions of the concavo-convex shape are communicated in the widthwise direction of the gap forming tape 5. The concavo-convex shape may be formed in any shape including a large number of round or semi-spherical protrusions 6 formed as shown in FIG. 3(B). Further, the concavo-convex shape may be formed not only on one surface but also on both surfaces of the gap forming tape 5. Further, in place of forming the concavo-convex shape, a large number of vent holes may be formed in the widthwise direction in the inside of the thickness of the gap forming tape 5. Alternatively, a porous body such as a sponge, or a non-woven fabric, or a woven fabric maybe used as the gap forming tape 5. Further, without forming the cocavo-convex surface and the vent holes, a plurality of gap forming pieces having a suitable thickness may be mounted on the resin tape 1 at a proper interval in the longitudinal direction.

In the above-mentioned constitution, the gap forming tape 5 is disposed at the outside of the ridges 2 corresponding to the cores 4 and the outside of the gap forming tape 5 is covered with the trailing end brim portion in a bulged shape. Accordingly, the vent holes are hardly seen from the outside thus exhibiting an excellent appearance. Further, by overlapping the gap forming tape 5 on the outside portions of the cores 4, the strength of the flexible hose 7 can be enhanced.

Figure 5:
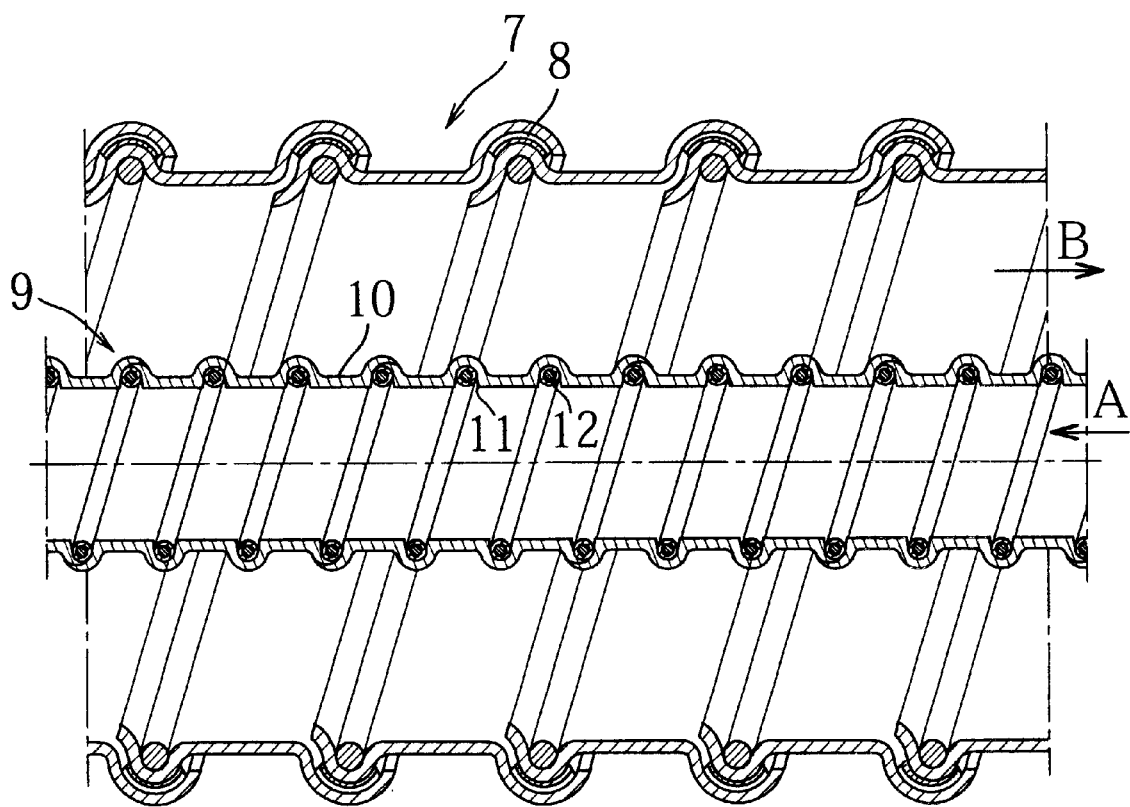
FIG. 5 is a cross-sectional view showing an example of usage of the flexible hose.

FIG. 5 shows one specific example of use of the flexible hose 6. This flexible hose 7 is used as an outer tube of a double-tube structure so that a gas or liquid to flow in an inner tube 9 may be cooled by the air between the inner tube 9 and the outer tube or the flexible hose 6.

In the inner tube 9, for example, the gas or liquid flows leftward, as indicated by arrow A in FIG. 5. The gas or liquid in the inner tube 8 can be cooled by forcing the cooling air to flow rightward, as indicated by arrow B in FIG. 5, in the space between the flexible hose 7 of the invention and the inner tube 9. At this time, the cooling efficiency can be enhanced higher by introducing fresh air at a proper rate through the vent gaps 8 of the flexible hose 7. Another using method may be exemplified by returning the gas having been fed through the inner tube 9 at the end to circulate returned gas into the outer tube or the flexible hose 7 of the invention while allowing the partial gas to leave through the vent gaps 8.

In FIG. 5, the inner tube 9 is also made of the flexible hose by winding a soft resin tape 10 similar to the resin tape 1 helically and by adhering or fusing the confronting end edge portions of the tapes leading and trailing in the longitudinal direction. On the other hand, the tape 10 forming the inner tube 9 is also semicircularly bulged at a plurality of widthwise portions to form grooves 11 in its inner circumference, and a reinforcing core 12 of a hard synthetic resin or a metal wire is buried in the grooves 11.

Figure 6:
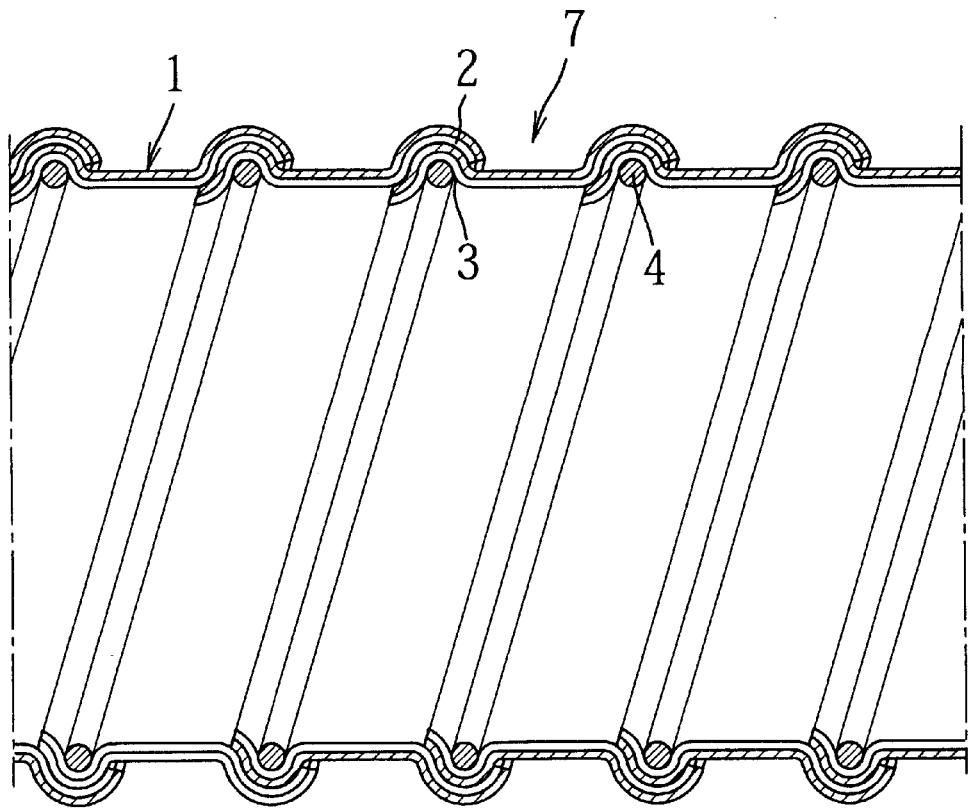
FIG. 6 is a cross-sectional view of an essential part of a flexible hose of other embodiment of the present invention.
Figure 7:
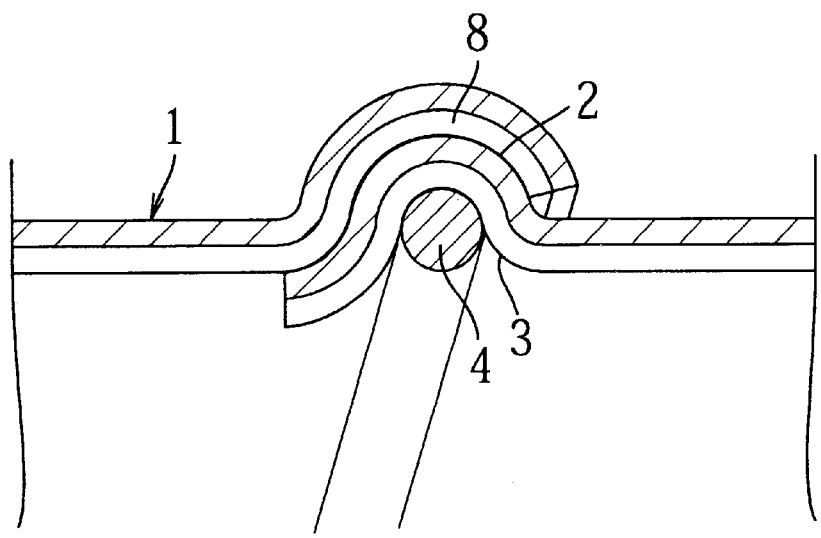
FIG. 7 is an enlarged view of an essential part of the flexible hose.
Figure 8:
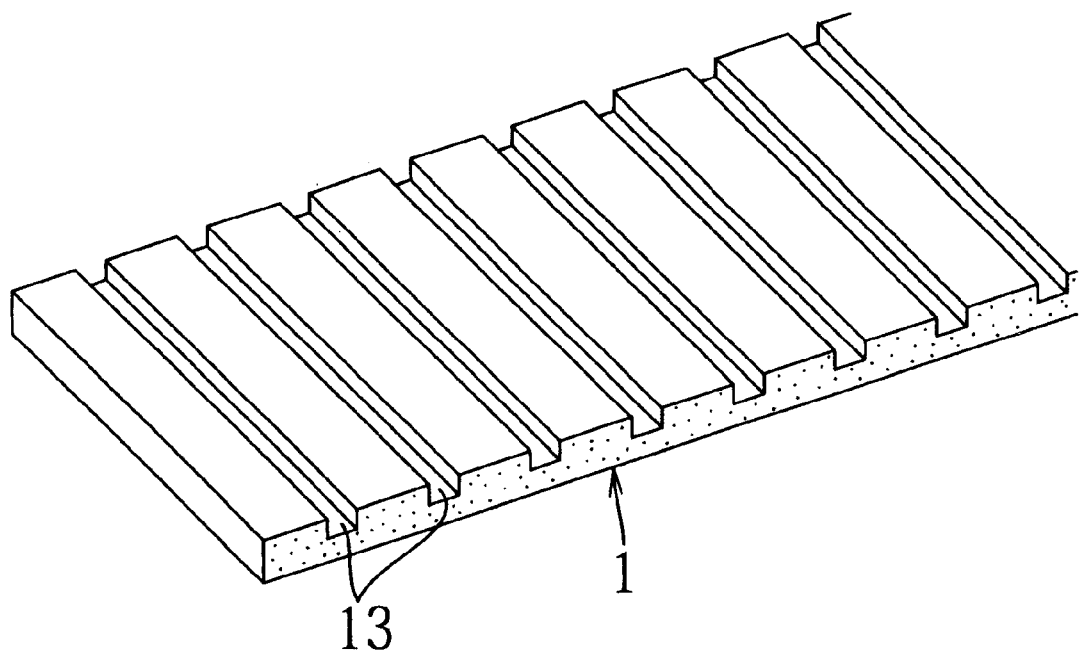
FIG. 8 is a perspective view of an essential part of a resin tape for forming the flexible hose.
Figure 9:
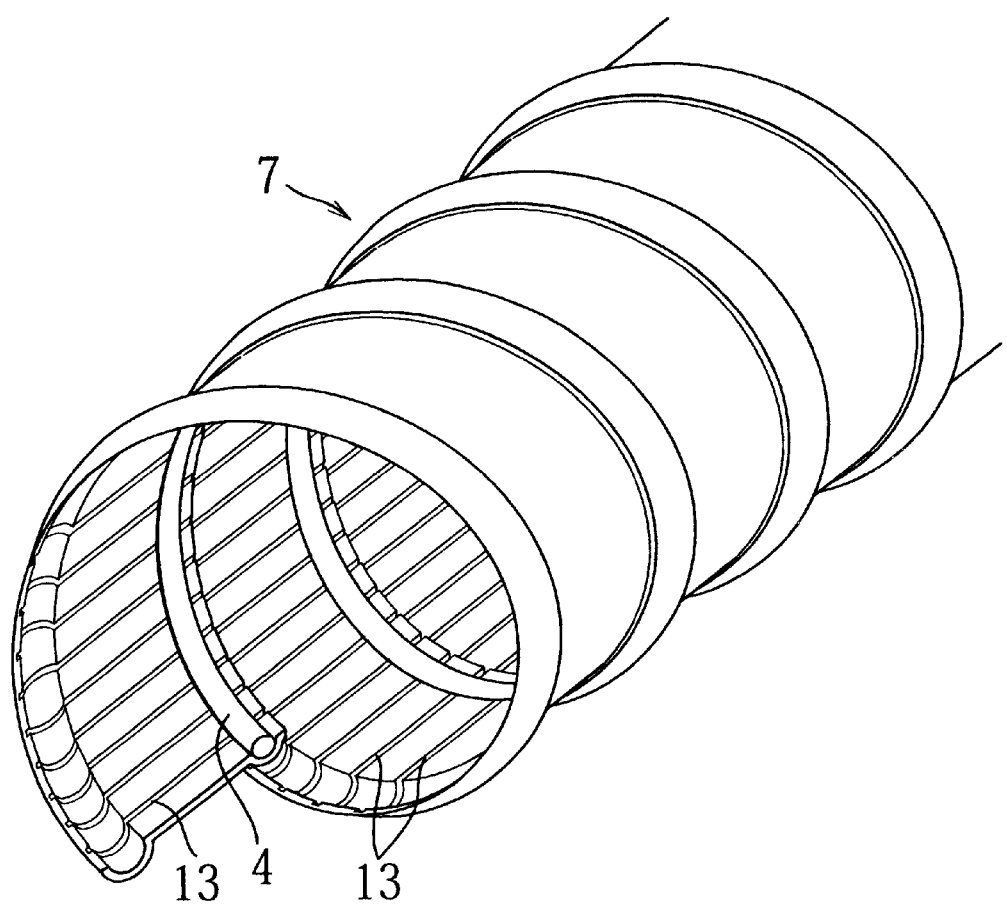
FIG. 9 is a perspective view of an essential part of the flexible hose.

FIG. 6 to FIG. 8 show a flexible hose of another embodiment of the present invention. In stead of using the gap forming member such as the gap forming tape 5 described in the above-mentioned embodiment, as shown in FIG. 8, on a surface which forms the hose inside of a resin tape 1 which is wound helically, a large number of grooves 13 extending in the widthwise direction are formed in a spaced-apart manner in the longitudinal direction of the resin tape 1 so as to form the concavo-convex shape on the surface of the resin tape 1.

Then, by winding the resin tape 1 helically in such a manner that the trailing end brim portions of the resin tape 1 are overlapped and adhered to or fused to the outside of the leading end brim portions, vent gaps 8 which make the inside and the outside of a hose 7 communicate with each other are formed by bottom portions of the concavo-convex shape at the overlapped portions as in the case of the previous embodiment.

In this case also, the concavo-convex shape for forming the vent gaps 8 may adopt any shape so long as the bottom portions are communicated in the tape widthwise direction in the range of the overlapped portions. For example, the concavo-convex shape may be formed by rounded or semi-spherical protrusions as shown in FIG. 3B or may be formed on both front and rear surfaces of the resin tape 1. Further, it is not always necessary to form the concavo-convex shape over the full width of the resin tape 1 shown in FIG. 8 in the widthwise direction. The concavo-convex shape may be formed in a range slightly longer than the overlapped portions of the end brim portions.

With the provision of such a structure, particular members for forming the gaps become unnecessary. That is, the flexible hose 7 can be formed by simply winding the resin tape 1 helically such that both end brim portions of the resin tape 1 are overlapped so that the hose 7 can be manufactured at a low cost.

This flexible hose 7 can be used as fermentation bath air feed hoses to be piped in a fermentation bath such as a dust disposer, a compost or a pickle bath. In this use, the flexible hose 6 can feed fresh air homogeneously to suppress the multiplication of anaerobic bacteria thereby to prevent the putrefaction and reduce the frequency of agitation.

When the flexible hose 6 is used as fish preserve oxygen feed hoses to be piped in a fish preserve, especially in a marine one, it can feed air (or oxygen) easily over a wide range by means of a pump thereby to prevent the massive death of bred fish, as might otherwise be caused due to shortage of dissolved oxygen by the red tide or the green seaweed (as called "AOKO" in Japanese) especially in summer.

Although the invention has been described in connection with its preferred embodiments, it should not be limited thereto but can be modified in various manners, as inclusive, within the scope of the appended claims.

What we claim is:

1. A flexible hose formed by winding a soft resin tape helically being characterized in that leading tape end brim portions and trailing end brim portions extending in the hose longitudinal direction of the resin tape are overlapped to each other in the hose radial direction and a gap forming member which makes the inside and the outside of the hose communicate with each other is interposed between the end brim portions.

2. A flexible hose according to claim 1, wherein a concavo-convex shape is formed on one surface or both surfaces a of the gap forming member.

3. A flexible hose formed by winding a soft resin tape helically being characterized in that leading tape end brim portions and trailing end brim portions extending in the hose longitudinal direction of the resin tape are overlapped to each other in the hose radial direction and are adhered to or fused to each other and a concavo-convex shape which makes the inside and the outside of the hose communicate with each other is formed on at least one of surfaces of the end brim portions which face each other in an opposed manner.

4. A flexible hose according to claim 1, wherein reinforcing cores are arranged at one or a plural portions in the widthwise direction of the resin tape in the tape longitudinal direction.

5. A flexible hose according to claim 4, wherein with respect to the end brim portions which are overlapped with each other, the reinforcing cores are arranged in inner peripheral portions of the inner end brim portions and ridges bulged outwardly along the cores are formed on outer peripheral surfaces of the inner end brim portions.

6. A flexible hose according to claim 1, wherein a separate hose is arranged in the inside of the flexible hose as an inner tube and a gas communication space is formed between the inner tube and the flexible hose disposed outside the inner tube.

7. A flexible hose according to claim 2, wherein reinforcing cores are arranged at one or a plural portions in the widthwise direction of the resin tape in the tape longitudinal direction.

8. A flexible hose according to claim 3, wherein reinforcing cores are arranged at one or a plural portions in the widthwise direction of the resin tape in the tape longitudinal direction.

9. A flexible hose according to claim 2, wherein a separate hose is arranged in the inside of the flexible hose as an inner tube and a gas communication space is formed between the inner tube and the flexible hose disposed outside the inner tube.

10. A flexible hose according to claim 3, wherein a separate hose is arranged in the inside of the flexible hose as an inner tube and a gas communication space is formed between the inner tube and the flexible hose disposed outside the inner tube.

11. A flexible hose according to claim 4, wherein a separate hose is arranged in the inside of the flexible hose as an inner tube and a gas communication space is formed between the inner tube and the flexible hose disposed outside the inner tube.

12. A flexible hose according to claim 5, wherein a separate hose is arranged in the inside of the flexible hose as an inner tube and a gas communication space is formed between the inner tube and the flexible hose disposed outside the inner tube.

* * * * *